Patented Dec. 4, 1951

2,576,968

UNITED STATES PATENT OFFICE 2,576,968

PRESSURE-SENSITIVE ADHESIVES

Charles O. Pike, Highland Park, and Cyrus W. Bemmels, Milltown, N. J., assignors to Industrial Tape Corporation, a corporation of New Jersey No Drawing. Application February 28, 1945, Serial No. 580,272

9 Claims. (Cl. 260—79.5)

This invention relates to normally tacky pressure-sensitive adhesives and to their method of production. While not limited thereto, it has particular reference to adhesives based on rubbers which are copolymers of butadiene with various organic monomers.

The improved adhesives are superior to ordinary rubber adhesives in stability during long storage and under moderate heat conditions and produce a permanently non-softening bond once applied. The improved adhesives are relatively free of cold flow, a defect which is present in many pressure-sensitive adhesives made from synthetic or natural polymers. In an adhesive tape, cold flow causes separation of the adhesive from the tape backing and a drift of the adhesive beyond its boundaries, causing smudging of the underlying surface. The elimination of cold flow thus avoids many cleaning operations. In addition to the advantages just alluded to, the improved adhesives are chemically quite compatible and therefore can be spread from relatively cheap solvents and compounded with a wide variety of cheap and generally available compounding ingredients.

The improved adhesives may be applied to a wide variety of backing materials including, to mention a few: fibrous or non-fibrous materials, such as paper, cloth, regenerated cellulose, cellulose ethers, cellulose esters, synthetic plastics, syntheic resins, and metals. The pressure-sensitive adhesive tapes which result are particularly useful in applications involving masking, holding, protecting, sealing, and cushioning.

While pressure-sensitive adhesives made from butadiene copolymer rubbers have been known for some time, they have met with almost unanimous rejection by the industry due to their "legginess." "Legginess" is a phenomenon evidenced during separation of a tape from the surface to which it has been applied by the splitting of the adhesive material into a large number of minute individual "legs" which cling to the surface and stretch up to and sometimes even beyond their elastic limits. A "leggy" mass in a pressure-sensitive adhesive tape makes the tape difficult to unwind and, in extreme cases, may split and a portion of it be deposited upon the surface to which the tape is temporarily attached.

In accordance with the instant invention, excellent normally tacky pressure-sensitive adhesive masses may be prepared substantially devoid of the objectionable "legginess" which usually is present in masses made from rubbery polymers, such as certain butadiene copolymers, by using with the copolymer a minor amount of curing agent. The amount is much less than is normally used with such rubber materials and curing is carried out substantially to completion, i. e., until no more curing agent is available for further reaction.

This invention is applicable to adhesives made from various related elastomers, especially to polymerized dienes, such as polybutadiene-1,3, polyisoprene, polymethylisoprene, polymethylpentadiene or the copolymers of butadienes with vinyl compounds, as, for instance, vinylbenzene or acrylonitrile. To explain the invention more clearly, however, reference will be made herein to certain specific copolymers—hereafter described as butadiene-styrene rubber—and commonly known in this country under the name GR–S, a nomenclature selected as standard by the government. GR–S polymers are made by the emulsion process of polymerization in the presence of oxidizing catalysts, such as peroxides, and contain substantially three parts by weight of butadiene per part of styrene. While good results have been obtained with butadiene-styrene copolymers having higher viscosities (corresponding to Mooney values of up to 100) it is preferred to use these elastomers at viscosities corresponding to Mooney values of between 30 and 70 when measured at 100° C. in the conventional manner. Polymers within this range when treated according to the instant invention show more satisfactory and smoother spreading characteristics than those of higher Mooney value correspondingly treated.

The improved treatment resides in curing the butadiene-styrene copolymer using the same amount or perhaps slightly less of an auxiliary curing agent or accelerator and a minor portion only of the amount of main or of active sulfur-bearing curing agent as is required to give the selected copolymer optimum tensile strength after complete cure. In selecting the proper amount of main curing agent, it has been found advantageous to choose a quantity which, after complete cure, results in a composition readily dispersible in straight aliphatic solvent, such as normal heptane, to give a solution comprising substantially 20% solids. The term complete cure as used in this specification is understood to refer to a duration of cure at the completion of which substantially all the curing agent has been spent and no further change due to heat and the presence of the curing agent occurs.

Satisfactory adhesive masses have been produced with various standard types of butadiene-rubber cured as above described. Indeed, long research has demonstrated that the type of curing agent is not critical. Generally, cures involving sulfur and an accelerator; a sulfur-bearing curing agent alone or in combination with others, or quinoids as the main curing agent with sulfur-less peroxide accelerators, have given satisfactory results. Among preferred curing agents are the thiuram sulfides, such as tetramethyl thiuram monosulfide, the tetraalkyl thiuram disulfides, thiuram tetrasulfides, such as di-N-pentamethylene thiuram tetrasulfide; and, in combination with other active sulfur-bearing curing agents, the dithiocarbamates, such as zinc dibutyl dithiocarbamate, selenium diethyl dithiocarbamate or piperidinium pentamethylene dithiocarbamate; condensates of aldehydes and amine, such as butyraldehyde-aniline condensate; p-quinone dioxime; and peroxides of organic or inorganic nature, such as tertiary butyl hydroperoxide.

In addition to the butadiene-styrene rubber which acts as the cohesive component of the adhesive and may comprise from 15 to 70% by weight of the adhesive mass, and several of the following ingredients in the proportions given: the curing agents, the total of which usually comprises less than 4% of the weight of the elastomer, between 50 and 150 parts of tackifier, between 10 and 150 parts by weight of plasticizer, between 1 and 300 parts by weight of filler, and a few parts of one of the standard antioxidants used with butadiene-styrene rubber are used per hundred parts by weight of butadiene-styrene rubber.

Tackifiers, sometimes referred to as tackifying resins, are well known in the art and the particular type selected is not critical, provided that the tackifier be compatible with the butadiene-styrene rubber in the amounts necessary to produce adhesives of the desired properties. For instance, rosin, hydrogenated or dehydrogenated rosin, the esters of such rosinous materials, and the higher-melting cycloparaffins (melting point above 60° C.), perform satisfactorily. The tackifiers may be added before or after the cure of the elastomer.

Among suitable compatible plasticizers are various stable oils, e. g., white mineral oil; an alicyclic light petroleum oil, e. g., one which consists chemically principally of hydrocarbons having 20-30 carbon atoms per molecule and one or more naphthenic or aromatic rings per molecule; and an unsaturated covulcanizable cyclo-aliphatic oil having the empirical formula $(C_3H_4)_n$ containing about 90% carbon and 10% hydrogen. Of course, any stable plasticizer compatible with the other ingredients of the composition will perform to satisfaction.

With sulfur cures involving either sulfur or an active sulfur-bearing curing agent, at least a small amount of zinc oxide filler is necessary. Alone, or in combination with the zinc oxide there may be used such inert fillers as titanium dioxide, clay, mica which is a mixture of glass and silica, or carbon blacks (e. g., a semi-reinforcing black).

Suitable antioxidants for butadiene-styrene rubber are well known in the art and may be used to advantage. By way of example only, there are suggested, the alkylated polyhydroxyphenols, polymerized trimethyldihydroquinoline, and polymerized 2,2,4-trimethyl 1,2-dihydroquinoline.

Although various methods of cure give satisfactory results, and while particularly satisfactory adhesives may be made from butadiene-styrene rubbers cured in stationary containers in the presence or absence of a solvent, it is preferred to cure the butadiene-styrene rubber, previously compounded with curing agents and fillers under continuous mastication, e. g., in a Werner and Pfleider Mixer, and in the presence of 10-50% of solvents based on the weight of the mass at temperatures between 200 and 250° F. for periods of time ranging between 20 minutes and several hours depending upon the type of curing agent and temperature selected. The relatively low and restricted temperature range is necessitated by the presence of the solvent which greatly improves spreading qualities and smoothes the mass where it is to be solvent spread. Where no solvent is used, temperatures up to and even exceeding 300 degrees may be used with correspondingly faster curing speeds. In case of a stationary cure, it is often found practical to reduce the intrinsic viscosity of the polymer after curing by intensive mastication on a cold mill before dissolving or spreading.

While the general procedure of making adhesives in accordance with this invention has been outlined above, the following examples will serve to illustrate preferred formulas and methods:

| Elastomer | A | B | C | D | E | F |
|---|---|---|---|---|---|---|
| Butadiene-Styrene Rubber: | | | | | | |
|   Mooney Value | 100 | 50 | 50 | 30 | 50 | 50 |
|   Parts by Weight | 100 | 100 | 100 | 100 | 100 | 100 |
| *Tackifier* | | | | | | |
| Hydrogenated Rosin_____parts by weight__ | | | | 66 | | |
| Dehydrogenated Rosin_____do____ | | 66 | | | | |
| Glyceride Ester of Hydrogenated Rosin_____do____ | 117 | | | | | 75 |
| Cycloparaffin (M. P. over 100° C.)_____do____ | | | | | 85 | |
| Rosin Glyceride_____do____ | | | 73 | | | |
| *Plasticizer* | | | | | | |
| White Mineral Oil_____do____ | | | | 40 | | |
| Unsaturated Cycloaliphatic oil_____do____ | 100 | | | | | |
| Alicyclic Petroleum Oil_____do____ | 28 | | | | 40 | |
| *Filler* | | | | | | |
| Titanium Dioxide_____do____ | | | | | 50 | |
| Zinc Oxide_____do____ | 200 | 2 | | 100 | 50 | 80 |
| Antioxidant_____do____ | 4 | | | | | |
| *Curing Agent* | | | | | | |
| Sulfur_____do____ | | | | | | 0.3 (5.0-8.0) |
| Diethyl Thiuram disulfide_____do____ | | | | | | 0.3 |
| Dipentamethylene Thiuram Tetrasulfide___do____ | 1.2 (3.0-5.0) | 0.3 (1.5-3.0) | | 0.5 (1.5-3.0) | 0.5 (1.5-3.0) | |

| Elastomer | A | B | C | D | E | F |
|---|---|---|---|---|---|---|
| *Curing Agent* | | | | | | |
| Zinc Dibutyl Dithiocarbamate....parts by weight.. | 0.7 (0.7-1.0) | | | 0.3 | | 0.3 |
| Piperidinium Pentamethylene Dithiocarbamate parts by weight.. | | 0.2 (0.2-0.4) | | | 0.25 | |
| Butyraldehyde-Aniline Condensate........do.... | | | | | 1.5 | |
| p-Quinone Dioxime...............do.... | | | 0.5 (1.2-1.8) | | | |
| Tertiary Butyl Hydroperoxide..........do.... | | | | 1.5 | | |
| Type of Cure............................ | (¹) | (²) | (²) | (¹) | (¹) | (²) |
| Temperature of Cure.................° F.. | 235 | 212 | 212 | 235 | 212 | 212 |
| Time of cure.....................hours.. | 1 | 1 | 1 | 1.5 | 0.5 | 1 |

¹ Masticator.
² Stationary.

The figures in parentheses represent the normal amount of curing agent for optimum tensile strength and are given merely for purposes of comparison.

In the above table, Example A shows the use of extra-high Mooney butadiene-styrene rubbers, Example B employs a very low amount of zinc oxide to produce a semi-transparent adhesive, and Example C is an example of an unfilled cured adhesive mass using a cure involving no sulfur-bearing ingredients. Examples D and E represent recommended regular all-around adhesives which perform to satisfaction on various masking and similar pressure-sensitive adhesive tapes. Variations of Examples B, C and F may require intensive cold milling after cure to arrive at most convenient spreading consistencies.

The adhesives show excellent aging and storage characteristics and are substantially free of excessive cold flow and "legginess." While various types of hot melt-spreading, such as calendering may be used to advantage in the application of the adhesives to backings, solvent spreading using perhaps a knife or a reverse roll coater is preferred. Particularly smooth and easily applied solvent spreads have been obtained where the cure is carried out under continuous mastication in the presence of a minor amount of solvent and using relatively low Mooney butadiene-styrene rubber.

The weight of the spread may vary, depending upon the type of backing used and upon the particular preferences of the coater. Good spreads, i. e., spreads providing substantially even residual coats, devoid of objectionable lumpiness after the solvent has evaporated, have been obtained varying between 0.7 ounce per square yard (using a transparent substantially unfilled mass on a flexible film backing) and 6 ounces per square yard (upon rough cloth backings).

The invention has been described in its preferred embodiments although many modifications thereof are included within its spirit. It will be understood, therefore, that the invention is to be limited only by the prior art and the scope of the appended claims.

What we claim is:

1. A pressure-sensitive adhesive according to claim 9 comprising a compatible tackifier.

2. A pressure-sensitive adhesive according to claim 9 comprising a stable and compatible oily plasticizer.

3. A pressure-sensitive adhesive according to claim 9 comprising an inert filler.

4. A pressure-sensitive adhesive according to claim 9 including an amount of zinc oxide 2-300% by weight of the rubbery copolymer of butadiene and styrene.

5. A pressure-sensitive adhesive according to claim 9 cured substantially to completion in substantial absence of inorganic filler material.

6. In the process of preparing a pressure-sensitive adhesive comprising a tacky composition using a cured rubbery copolymer of butadiene and styrene, the intermediate step of curing the rubbery copolymer of butadiene and styrene under continuous mastication in the presence of a minor proportion, 10-50% based on the weight of the composition, of a solvent for said composition.

7. In the process of preparing a pressure-sensitive adhesive comprising a tacky composition using a cured elastomeric base, the steps of curing the elastomeric base in substantial absence of mastication, and thereafter reducing the excessive intrinsic viscosity of the composition by intensive mastication on a substantially cold rubber mill.

8. In the process of preparing a pressure-sensitive adhesive comprising a tacky composition the step of curing a rubbery copolymer of butadiene and styrene completely at a temperature of 200-250° F. while leaving it dissolved and in a substantially dispersible state in 10-50% by weight of solvent based on the weight of said composition.

9. A pressure-sensitive adhesive comprising a tacky composition comprising a rubbery copolymer of butadiene and styrene vulcanized from its original leggy state to render the composition substantially devoid of objectionable legginess, by vulcanization substantially to completion, using a minor amount of curing agent, which amount is a minor fraction only of the amount of identical curing agent that would give the composition optimum tensile strength.

CHARLES O. PIKE.
CYRUS W. BEMMELS.

REFERENCES CITED

The following references are of record in the file of this patent:

UNITED STATES PATENTS

| Number | Name | Date |
|---|---|---|
| 1,082,106 | Arsem | Dec. 23, 1913 |
| 2,142,039 | Abrams et al. | Dec. 27, 1938 |
| 2,397,774 | Buckley | Apr. 2, 1946 |
| 2,410,079 | Kellgren | Oct. 29, 1946 |

FOREIGN PATENTS

| Number | Country | Date |
|---|---|---|
| 387,381 | Great Britain | Feb. 6, 1933 |

OTHER REFERENCES

Pages 7 and 8, The Compounding of Buna S, Report No. 42-4, Dec. 1942. E. I. du Pont de Nemours & Co., Wilmington, Delaware.